(12) United States Patent
Buck et al.

(10) Patent No.: US 8,086,988 B2
(45) Date of Patent: Dec. 27, 2011

(54) CHIP DESIGN AND FABRICATION METHOD OPTIMIZED FOR PROFIT

(75) Inventors: Nathan Buck, Underhill, VT (US);
Howard H. Chen, Yorktown Heights, NY (US); James P. Eckhardt, Pleasant Valley, NY (US); Eric A. Foreman, Fairfax, VT (US); James C. Gregerson, Hyde Park, NY (US); Peter A. Habitz, Hinesburg, VT (US); Susan K. Lichtensteiger, Essex Junction, VT (US); Chandramouli Visweswariah, Croton-On-Hudson, NY (US); Tad J. Wilder, South Hero, VT (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 12/467,326

(22) Filed: May 18, 2009

(65) Prior Publication Data

US 2010/0293512 A1  Nov. 18, 2010

(51) Int. Cl.
G06F 9/455 (2006.01)
G06F 17/50 (2006.01)

(52) U.S. Cl. .......... 716/132; 716/54; 716/108; 716/113; 716/134

(58) Field of Classification Search .................. 716/54, 716/132, 108, 113, 134
See application file for complete search history.

(56) References Cited

U.S. PATENT DOCUMENTS

| | | | |
|---|---|---|---|
| 4,472,871 A | 9/1984 | Green et al. | |
| 5,880,967 A | 3/1999 | Jyu et al. | |
| 5,941,143 A | 8/1999 | Jawahir et al. | |
| 6,133,582 A | 10/2000 | Osann, Jr. et al. | |
| 6,587,991 B1 | 7/2003 | Mbouombouo et al. | |
| 7,058,638 B2 * | 6/2006 | Singh | 707/757 |
| 7,170,891 B2 | 1/2007 | Messenger | |
| 7,424,694 B2 * | 9/2008 | Ikeda | 716/113 |

(Continued)

OTHER PUBLICATIONS

Visweswariah et al., "First-Order Incremental Block-Based Statistical Timing Analysis", Computer-Aided Design of Integrated Circuits and Systems, IEEE Transactions, vol. 25, Issue 10, 2006.

(Continued)

*Primary Examiner* — Vuthe Siek
*Assistant Examiner* — Brian Ngo
(74) *Attorney, Agent, or Firm* — Gibb I.P. Law Firm, LLC (57) ABSTRACT

Disclosed is a computer-implemented method for designing a chip to optimize yielding parts in different bins as a function of multiple diverse metrics and further to maximize the profit potential of the resulting chip bins. The method separately calculates joint probability distributions (JPD), each JPD being a function of a different metric (e.g., performance, power consumption, etc.). Based on the JPDs, corresponding yield curves are generated. A profit function then reduces the values of all of these metrics (e.g., performance values, power consumption values, etc.) to a common profit denominator (e.g., to monetary values indicating profit that may be associated with a given metric value). The profit function and, more particularly, the monetary values can be used to combine the various yield curves into a combined profit-based yield curve from which a profit model can be generated. Based on this profit model, changes to the chip design can be made in order to optimize yield as a function of all of the diverse metrics (e.g., performance, power consumption, etc.) and further to maximize the profit potential of the resulting chips.

25 Claims, 4 Drawing Sheets

U.S. PATENT DOCUMENTS

| | | | |
|---|---|---|---|
| 7,941,768 B1* | 5/2011 | Wei | 716/54 |
| 2002/0146992 A1 | 10/2002 | Khosrowbeygi | |
| 2008/0028256 A1 | 1/2008 | Lichtensteiger et al. | |
| 2008/0059143 A1* | 3/2008 | Chiu et al. | 703/14 |
| 2008/0313590 A1 | 12/2008 | Foreman et al. | |
| 2009/0182522 A1* | 7/2009 | Visweswariah et al. | 702/117 |
| 2009/0265674 A1* | 10/2009 | Buck et al. | 716/6 |

OTHER PUBLICATIONS http://www.edn.com/blog/1480000148/post/1240018324.html.

* cited by examiner

CHIP DESIGN AND FABRICATION METHOD OPTIMIZED FOR PROFIT

BACKGROUND

1. Field of the Invention

The embodiments of the invention generally relate to chip design and fabrication and, more specifically, to a method of designing a chip to optimize yield as a function of multiple metrics (e.g., performance, power consumption, etc.) and further to maximize profit potential.

2. Description of the Related Art

In conventional chip design and fabrication, Statistical Static Timing Analysis (SSTA) can be used to determine the parametric yield of a designed chip as a function of chip performance (i.e., the fraction or percentage of chips that are able to be manufactured and that can achieve pre-defined performance limits, such as clock frequency limits). To accomplish this, the dependence of chip performance on multiple different process parameter variations can be analyzed and a joint probability distribution can be calculated. Based on this joint probability distribution, a yield-performance curve can be generated. Design changes can then be made in order to optimize yield as a function of performance. Additionally, a similar analysis technique can used to determine the parametric yield of the same designed chip as a function of some different metric, for example, power consumption (i.e., the fraction or percentage of chips that are able to be manufactured and that can achieve pre-defined power consumption limits). To accomplish this, the dependence of chip power consumption on multiple different process parameter variations can be analyzed and a joint probability distribution can be calculated. Based on this joint probability distribution, a yield-power consumption curve can be generated. Again, design changes can then be made in order to optimize yield as a function of this metric. However, because the different metrics (e.g., performance, power consumption, etc.) may have different sensitivities to different process variations, making design changes to optimize yield as a function of one metric may result in a reduction in yield as a function of another metric and vice versa. Furthermore, design changes required to optimize yield as a function of any metric may not be cost-efficient.

SUMMARY

In view of the foregoing, disclosed herein are embodiments of a computer-implemented method of designing a chip to optimize yielding parts in different bins as a function of multiple diverse metrics and further to maximize the profit potential of the resulting chip bins. Specifically, the embodiments separately calculate multiple different joint probability distributions, each as a function of a different metric (e.g., performance, power consumption, etc.). Discrete yield curves are then generated based on each of the joint probability distributions. That is, each joint probability distribution function is integrated over an operating range of interest (i.e., minimum and maximum limits on the particular metric which correlate to the parameters of the statistical models) to create a yield curve. A profit function then reduces the values of all of these metrics (e.g., performance values, power consumption values, etc.) to a common profit denominator (e.g., to monetary values indicating profit that may be associated with a given metric value). The profit function and, more particularly, the monetary values can be used to combine the various yield curves into a combined profit-based yield curve from which a profit model can be generated. Based on this profit model, changes to the chip design can be made in order to optimize yield as a function of all of the diverse metrics (e.g., performance, power consumption, etc.) and further to maximize the profit potential of the resulting chips. That is, this profit model allows a designer to balance, based on potential profit changes, the impact that design changes (i.e., parameter changes) would have on yield as a function of different metrics and, thereby to determine the best design for both yield and profit.

Generally, disclosed herein are embodiments of a computer-implemented chip design and fabrication method. The embodiments comprise separately calculating joint probability distributions, each being a function of a different metric. Discrete yield curves can then generated based on each of the joint probability distributions. That is, the embodiments can comprise calculating, by a computer and based on a design of a chip, a first joint probability distribution as a function of first values for a first metric and, based on the first joint probability distribution, generating a first yield curve. The embodiments can comprise further calculating, by the computer and based on the design of the chip, a second joint probability distribution function as a function of second values for a second metric and, based on the second joint probability distribution function, generating a second yield curve. Optionally, the embodiments can further comprise calculating, by the computer and based on the design of the chip at least one additional probability distribution as a function of additional values for at least one additional metric and, based on said at least one additional probability distribution, generating at least one additional yield curve.

For example, the first metric can comprise performance (e.g., clock frequency) and the first joint probability distribution can be calculated by performing a Statistical Static Timing Analysis. The second metric and, if applicable, any additional metric can comprise, for example, any of the following metrics: power consumption, voltage level, temperature, life expectancy, chip size, number of metal levels, quality level, etc. The joint probability distributions as a function of any of these metrics can be calculated using various different metric-specific analysis techniques, as appropriate.

It should be understood that the various joint probability distributions described above will be dependent generally upon a same set of predetermined settings (e.g., chip specifications based on customer requirements). However, such calculations will further be dependent upon different process sensitivities of the different metrics (i.e., different process sensitivities of the first metric, the second metric and any additional metrics). That is, because one metric may be more sensitive to variations in a given parameter than another metric (i.e., because the values of one metric may be more prone to change than the values of another metric in response to process variation in a given parameter), the above-described yield calculations are process-sensitivity dependent.

Once the yield curves are generated, a profit function can be applied that reduces the values of all of the metrics to a common profit denominator. For example, monetary values can be associated with the first values, the second values, and with any additional values. These monetary values can then be used to combine the various yield curves of the various metrics into a combined profit-based yield curve from which a profit model can be generated. Subsequently, the design of the chip can be modified, based on the combined profit-based yield curve and, more particularly, based on the profit model, in order to optimize yield as a function of the different values for the different metrics (i.e., the first values, the second values and any additional values) and maximize profit potential by considering the monetary values associated with the different values for the different metrics (i.e., the first values, the second values, and any additional values). That is, this model allows a designer to consider the impact on profit of any proposed design changes (i.e., parameter changes), when performing a balancing process (i.e., a trade-off process between proposed design changes) in order to optimize yield as a function of multiple different metrics and, thereby to determine the best design for both yield and profit.

Post design process steps can include, but are not limited to, the following. Chips can be fabricated (i.e., manufactured) based on the design, as modified. Optionally, the results of the fabrication process (i.e., the manufactured chips) can be evaluated, for example, for changes in process sensitivities impacting any one or more of the metrics (i.e., the first metric, second metric and/or any additional metric) and the design can be remodified to account for such process sensitivities. Finally, a binning process can be performed. Specifically, chips can be separated into bins such that each bin represents a specific operating range for a specific metric of interest.

One exemplary embodiment of the disclosed computer-implemented method relates specifically to designing a chip to optimize yielding parts in different bins as a function performance and power consumption, while simultaneously maximizing the profit potential of the resulting chip bins. Specifically, this embodiment separately calculates a first joint probability distribution as a function of performance and a second joint probability distribution as a function of power consumption. That is, this embodiment comprises calculating, by a computer and based on a design of a chip, a first joint probability distribution as a function of first values representing performance. It accomplishes this by performing a Statistical Static Timing Analysis and, based on the analysis, generating a canonical timing model. This embodiment further comprises calculating, by a computer and based on the design of the chip, a second joint probability distribution as a function of second values representing power consumption. It accomplishes this by performing power consumption analysis and, based on the analysis, generating a canonical power model. The canonical power model and the canonical timing model are dependent upon the same set of predetermined settings (e.g., chip specifications based on customer requirements, such as minimum and maximum thresholds for voltage level, temperature, life expectancy, chip size, number of metal levels, quality level, etc.), but on different process sensitivities.

First and second yield curves are generated based on the first and second joint probability distributions, respectively.

Once the first and second yield curves are generated, a profit function then reduces the values of both metrics (i.e., the first values or performance values and the second values or power consumption values) to a common profit denominator (e.g., to monetary values indicating profit that may be associated with a given metric value). Specifically, monetary values can be associated with the performance values and with the power consumption values. Then, these monetary values are used to combine the first yield curve and the second yield curve into a combined profit-based yield curve. Based on the combined profit-based yield curve, a timing-power-profit model is generated.

Based on this timing-power-profit model, the design of the chip can be modified in order to simultaneously optimize yield as a function of both the first values and the second values (i.e., the performance and power consumption values) and maximize profit potential by considering the monetary values for the performance and power consumption values. That is, this timing-power-profit model allows a designer to consider the impact on profit of any proposed design changes (i.e., parameter changes), when performing a balancing process (i.e., a trade-off process between proposed design changes) in order to optimize yield as a function of both performance and power consumption in order to determine the best design for both yield and profit.

Post design process steps can include, but are not limited to, the following. Chips can be fabricated (i.e., manufactured) based on the design, as modified. Optionally, the results of the fabrication process (i.e., the manufactured chips) can be evaluated, for example, for changes in process sensitivities impacting any performance and/or power consumption and the design can be remodified to account for such process sensitivities. Finally, a binning process can be performed. Specifically, chips can be separated into bins such that each bin represents a specific operating range for a specific metric of interest (in this case, either performance or power consumption).

Also disclosed herein are embodiments of a computer program product comprising a computer usable medium having computer useable program code embodied therewith. In these embodiments the computer usable program code is configured to perform the above-described chip design method embodiments.

BRIEF DESCRIPTION OF THE SEVERAL VIEWS OF THE DRAWINGS

The embodiments of the invention will be better understood from the following detailed description with reference to the drawings, which are not necessarily drawing to scale and in which.

DETAILED DESCRIPTION

The embodiments of the invention and the various features and advantageous details thereof are explained more fully with reference to the non-limiting embodiments that are illustrated in the accompanying drawings and detailed in the following description.

As discussed above, in conventional chip design and fabrication, Statistical Static Timing Analysis (SSTA) can be used to determine the parametric yield of a designed chip as a function of chip performance (i.e., the fraction or percentage of chips that are able to be manufactured and that can achieve pre-defined performance limits, such as clock frequency limits). To accomplish this, the dependence of chip performance on multiple different process parameter variations can be analyzed and a joint probability distribution function can be computed. From this a yield curve as a function of performance restrictions can be generated by integrating the joint probability distribution function over an operating range of interest (i.e., minimum and maximum limits on performance which correlate to the parameters of the statistical model). Design changes can then be made in order to optimize yield as a function of performance.

Specifically, in statistical timing methodology the delay of a path can be expressed in a Taylor Series towards the process parameters. Process parameters describe how device and interconnect wire change with process variations, like channel length and threshold voltage changes.

$$D = D_0 + \sum_{i=1}^{n} a_i \Delta X_i$$

The delay D is equal to the mean value $D_0$, and the sum of all delay sensitivities to the parameter i multiplied with the delta of the parameter i off the mean value. In this approach also environment parameters like Voltage, Temperature and chip age can be included. For each parameter a parameter value $\Delta X_i$ is set to give the specific delay. The distribution of parameter describes how many chips have any specific process parameter value. This is set in the probability distribution function. One exemplary probability distribution function is the following Gaussian Distribution:

$$\phi_i(\Delta x_i) = \frac{1}{\sigma 2\pi} \exp\left(-\frac{(\Delta x_i - \mu_i)^2}{(2\sigma_i)^2}\right)$$

Where $\mu$ is the mean of the distribution and $\sigma$ is the standard deviation of the distribution. Other parameters can have different distributions.

The probability distribution for the delay depends on all parameters and is described in the Joint Probability Distribution. Function [JPDF]:

$$\phi(\vec{x}) = \prod_i \phi_i(\Delta x_i)$$

Where $\vec{x}$ is the vector containing all parameter values offset from mean.

The manufacturing process control sets acceptable limits and mean values for the manufacturing parameter distribution. The chip use conditions set the limits for the environmental parameters. The vector of these limits and means sets the values of JPDF. Timing and design optimization is done to ensure that all path delays and power consumption on the chip meets the customer requirements or all parameters with the set limits. The integral over the process space of the JPDF is the Yield of the chips:

$$\Phi(\vec{x}_{max}, \vec{x}_{min}) = \int_{\vec{x}_{min}}^{\vec{x}_{max}} \phi(\vec{x}) d\Delta x_1 \ldots d\Delta x_n$$

Were $\vec{x}_{max}$, $\vec{x}_{min}$ are the upper and lower limits on all parameters.

The same type of formula can also be created for the chip power and other chip design values. That is, this same type of analysis can be used to determine the probability distribution function and then parametric yield of the same designed chip as a function of power consumption (i.e., the fraction or percentage of chips that are able to be manufactured and that can achieve pre-defined power consumption limits). To accomplish this, the dependence of chip power consumption on multiple different process parameter variations can be analyzed and a joint probability distribution can be calculated. Based on this joint probability distribution, a yield-power consumption curve can be generated by integrating the probability distribution function over an operating range of interest (i.e., minimum and maximum limits on power consumption which correlate to the parameters of the statistical model). Again, design changes and design requirements can then be made in order to optimize yield as a function of this metric. However, because the different metrics (e.g., performance, power consumption, etc.) may have different sensitivities to different process variations, making design changes to optimize yield as a function of one metric may result in a reduction in yield as a function of another metric and vice versa. Furthermore, design changes required to optimize yield as a function of any metric may not be cost-efficient.

In view of the foregoing, disclosed herein are embodiments of a computer-implemented method of designing a chip to optimize yielding parts in different bins as a function of multiple diverse metrics and further to maximize the profit potential of the resulting chip bins. Specifically, embodiments separately calculate multiple different joint probability distributions, each as a function of a different metric (e.g., performance, power consumption, etc.). Discrete yield curves are then generated based on each of the joint probability distributions. That is, each joint probability distribution function is integrated over an operating range of interest (i.e., minimum and maximum limits on the particular metric which correlate to the parameters of the statistical models) to create a yield curve. A profit function then reduces the values of all of these metrics (e.g., performance values, power consumption values, etc.) to a common profit denominator (e.g., to monetary values indicating profit that may be associated with a given metric value). The profit function and, more particularly, the monetary values can be used to combine the various yield curves into a combined profit-based yield curve from which a profit model can be generated. Based on this profit model, changes to the chip design can be made in order to optimize yield as a function of all of the diverse metrics (e.g., performance, power consumption, etc.) and further to maximize the profit potential of the resulting chips. That is, this model allows a designer to consider the impact on profit of any proposed design changes (i.e., parameter changes), when performing a balancing process (i.e., a trade-off process between proposed design changes) in order to optimize yield as a function of multiple different metrics and, thereby to determine the best design for both yield and profit.

Figure 1:
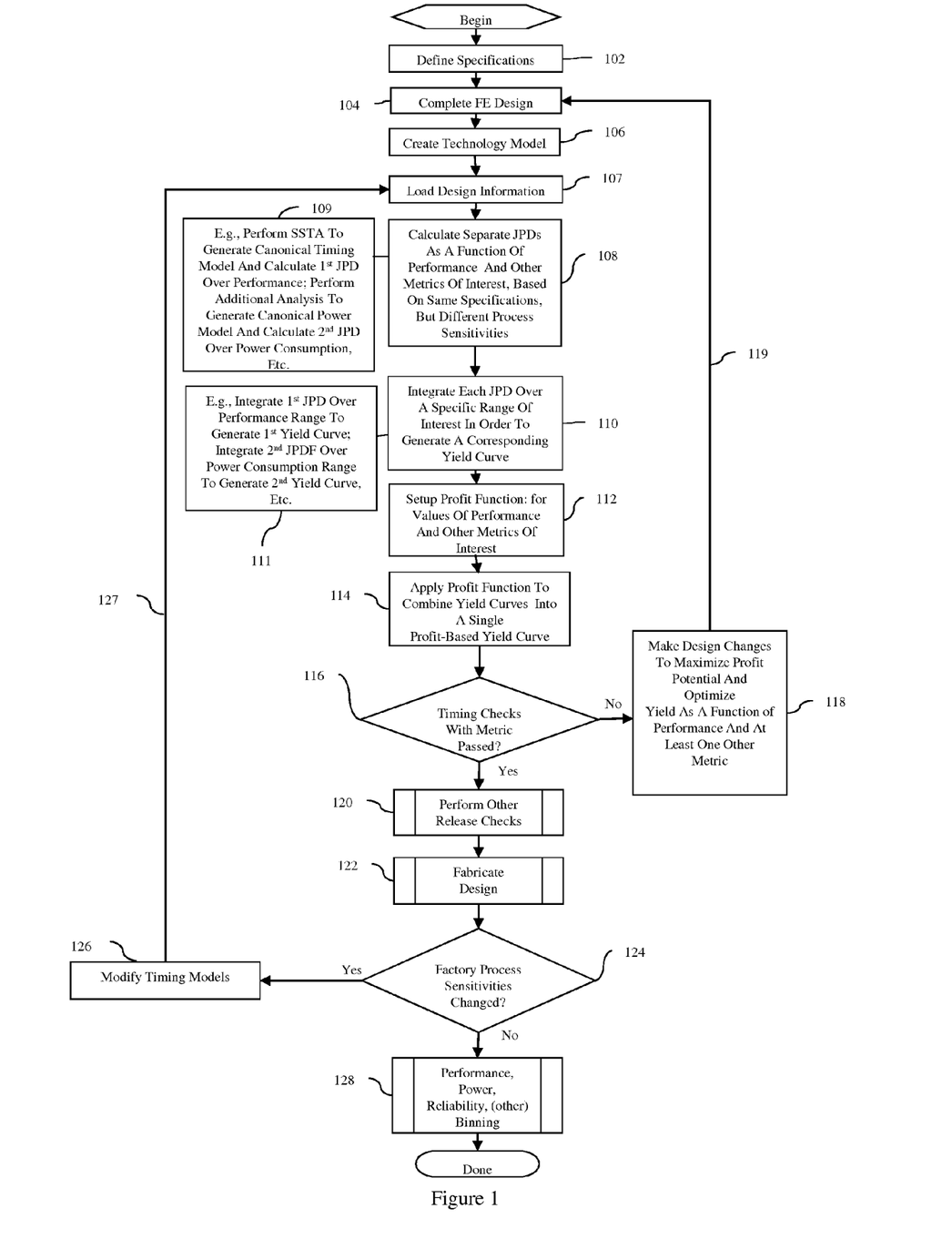
FIG. 1 is a flow diagram illustrating embodiments of the chip design and fabrication method.
Figure 2:
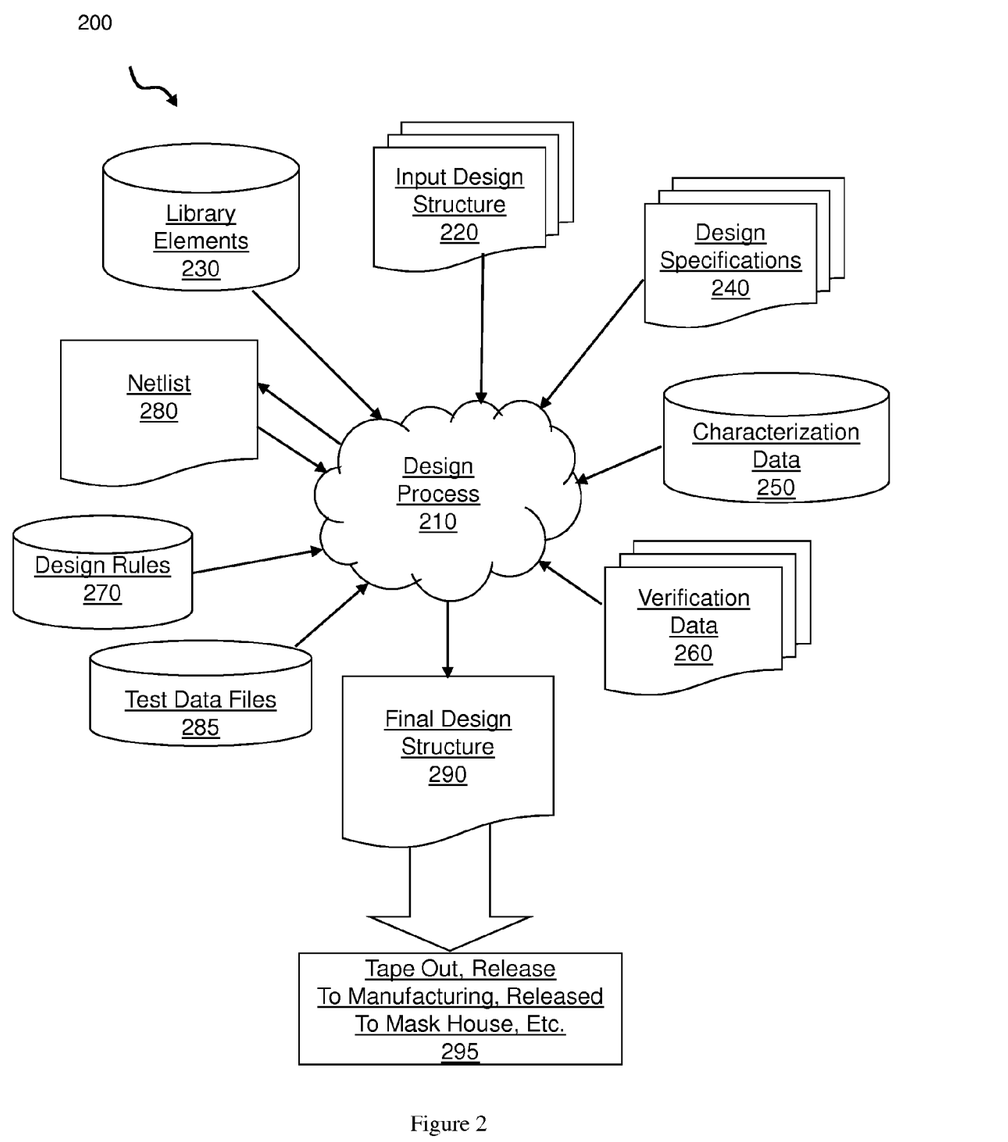
FIG. 2 is a block diagram showing an exemplary design flow 300 that can be used in conjunction with performance of the method embodiments of FIG. 1.
Figure 3:
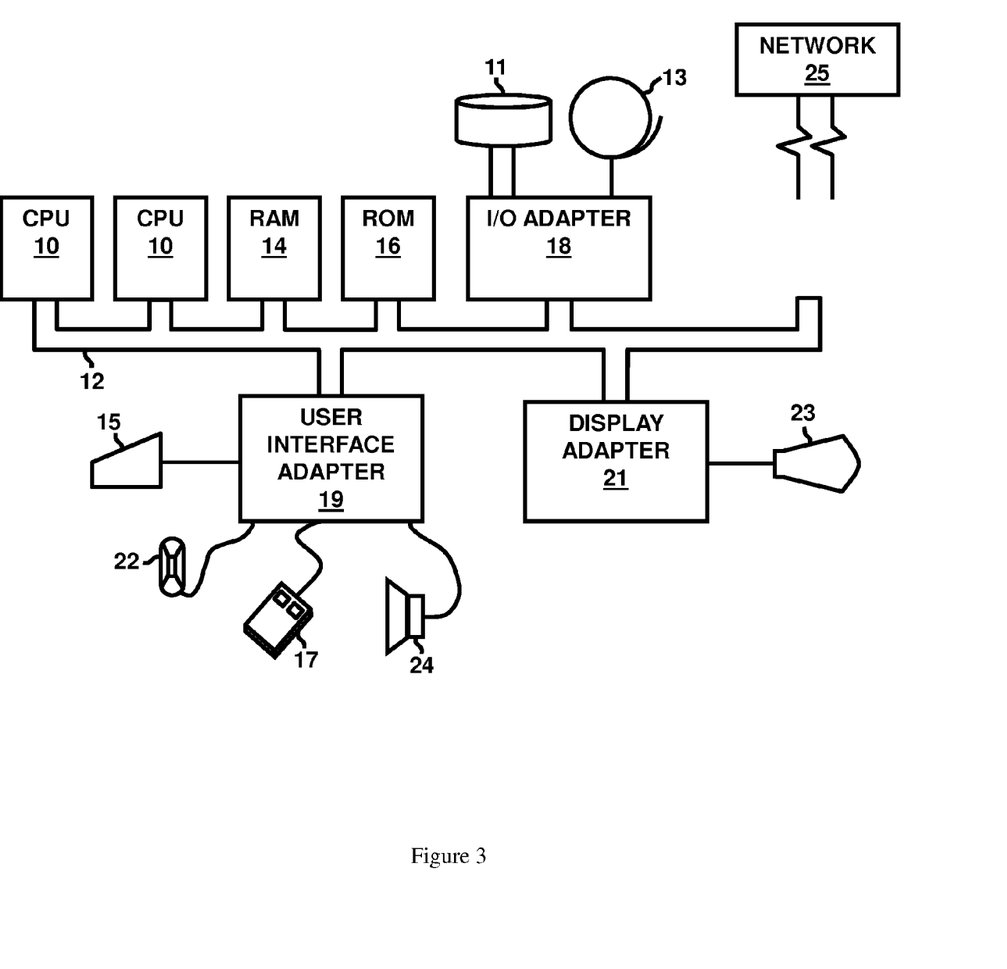
FIG. 3 is a schematic diagram illustrating an exemplary hardware environment that can be used to implement the method embodiments of FIG. 1.

Generally, disclosed herein are embodiments of a computer-implemented integrated circuit (IC) chip design and fabrication method that predicts yield, creates a profit function for design binning and performs yield optimization for maximum profit via a process sensitivity gradient. Specifically, FIG. 1 is a flow diagram setting out the process steps in the chip design and fabrication method embodiments; FIG. 2 is a block diagram showing an exemplary design flow 300 that can be used in conjunction with performance of the method embodiments and, particularly, in conjunction with chip design, simulation, test, layout, and manufacture; and FIG. 3 is a representative hardware environment that can be used to implement the method embodiments.

Referring to FIG. 1, items 102-108 represent the initial steps in the chip design method and fabrication method embodiments. The initial steps include accumulating design information (e.g., defining the specifications of the chip based on customer requirements (102), generating the front-end (FE) design for the chip (104), and creating a technology model based on the FE design (106)). The defined specifications can include, but are not limited to, the following customer requirements that will impact the value of the chip, the potential yield, and the potential profit:

(1) Process parameter targets and limits that describe the mean and distribution probability of the manufacturing process variation.

(2) Chip functionality limits (e.g., requiring a margin for same cycle hold tests).

(3) Chip performance limits (i.e., the clock cycle needed to support the customer application).

(4) Upper and lower voltage limits (i.e., the voltage limits that will be applied to the chip power supply).

(5) Upper and lower temperature limits (e.g., the cooling capability requirements).

(6) Chip power consumption limits.

(7) Chip reliability requirements (i.e., chip life expectancy limits, which define the power-on hours and the average voltage and temperature environments that the chip will experience).

(8) Chip die size.

(9) Number of metal levels.

(10) Test requirements to ensure the chip can be tested after manufacturing.

(11) Number of chips requested by the customer.

(12) Shipped Product Quality Level requested by the customer.

Then, this design information, including but not limited to, the above-listed specification, a design netlist, RC parasitic information, timing constraints, clock definitions, circuit delay models, etc., is loaded (107) and processed in the design process 210 in the design flow 200 of FIG. 2 (see detailed discussion of design flow 200 below), according to method steps 108-120.

Specifically, once the design information is loaded at process 107, the embodiments comprise separately calculating joint probability distributions, each as a function of a different metric of interest (108). That is, the embodiments comprise calculating, by a computer and based on the FE design of the chip, a first joint probability distribution as a function of first values for a first metric, a second joint probability distribution as a function of second values for a second metric, and, optionally, at least one additional joint probability distribution as a function of additional values for at least one additional metric.

For example, the first metric can comprise performance (e.g., clock frequency). A first joint probability distribution as a function of performance can be calculated by performing a Statistical Static Timing Analysis (SSTA) (109). Specifically, this SSTA can compute sensitivities to sources of variation and how these sensitivities impact timing (i.e., delays, transition times, slacks, etc.). The second metric and, if applicable, any additional metric can comprise, for example, any of the following metrics: power consumption, voltage level, temperature, life expectancy, chip size, number of metal levels, quality level, etc. (109). The second joint probability distribution and any additional joint probability distribution as a function of any of these metrics can be calculated using various different metric-specific analysis techniques, as appropriate.

After the joint probability distributions are calculated, separate yield curves associated with each metric can be generated. That is, a first yield curve is generated based on the first joint probability distribution, a second yield curve is generated based on the second joint probability distribution, etc. (110). Specifically, the first joint probability distribution is integrated over a first operating range of interest to create the first yield curve. For example, if the first metric is performance, the first joint probability distribution can be integrated over a minimum and maximum performance range to generate a yield-performance curve (111). Such a yield curve show the fraction or percentage of working chips that can be manufactured for a given clock definition and state of the netlist. This depends upon the manufacturing models. Similarly, a second joint probability distribution is integrated over a second operating range of interest to create the second yield curve. For example, if the second metric is power, the second joint probability distribution can be integrated over a minimum and maximum power consumption range to generate a yield-power consumption curve (111).

It should be understood that the various statistical calculations described above and performed in processes 108-111 will be dependent generally upon a same set of predetermined settings (e.g., customer requirements). However, such calculations will further be dependent upon different process sensitivities of the different metrics (i.e., different process sensitivities of the first metric, the second metric and any additional metrics). That is, because one metric may be more sensitive to variations in a given parameter than another metric (i.e., because the values of one metric may be more prone to change than the values of another metric in response to process variation in a given parameter), the above-described yield calculations are process-sensitivity dependent.

Once the statistical calculations are performed to produce the yield curves at process 110, a profit function can be set up and applied to reduce the values of all of the metrics in the different yield curves to a common profit denominator (112). For example, monetary values can be associated with the first values, the second values, and with any additional values. The more products of higher value in bins of demand will result in greater profit. For example, mobile applications may be able to realize greater profits for relatively low power consumption values and relatively high performance values (e.g., increased clock frequencies, which may also be expressed in terms of decreased delay). Thus, in such applications relatively low power consumption values and relatively high performance values would be associated with relatively high monetary values. Additionally, the importance of the particular metric to the application can be weighted based on these monetary values. For example, in a particular mobile application, ultra low power consumption may be considered more important than performance. Thus, in such an application lower power consumption values could be associated with higher monetary values than higher performance values.

The power function and, more particularly, the monetary values can then be used to combine the various yield curves generated at process 110 (i.e., the first yield curve, the second yield curve and any additional yield curves) into a combined profit-based yield curve from which a profit-based model (i.e., a yield-weighted profit function) can be generated (114).

Based on the combined profit-based yield curve or, more particularly, the single profit-based model, the design can be modified in order to simultaneously optimize yield as a function of the different values of the different metrics (i.e., the first values, the second values, and any additional values) and maximize profit potential by considering the monetary values associated with the different values for the different metrics (i.e., the monetary values associated with the first values, the second values and any additional values) (116-118). That is, this model allows a designer to consider the impact on profit of any proposed design changes (i.e., parameter changes), when performing a balancing process (i.e., a trade-off process between proposed design changes) in order to optimize yield as a function of the multiple different metrics (i.e., as a function of the first metric, second metric and any additional metrics) and maximize profit potential by considering the monetary values associated with the different values for the different metrics (i.e., the first values, the second values, and any additional values). That is, this model allows a designer to consider the impact on profit of any proposed design changes (i.e., parameter changes), when performing a balancing process (i.e., a trade-off process between proposed design changes) in order to optimize yield as a function of multiple different metrics and, thereby to determine the best design for both yield and profit.

Specifically, the model can be translated into a set of metrics which allow for design changes (e.g., design changes which would impact power consumption, timing, etc.) to directly vary the profit potential of the chip. After the design modifications are selected, the processes 104-116, as described above, can be repeated as necessary in order to achieve the optimal design for yield and profit (119).

Thus, the design process 210 of FIG. 2 now extends from closing timing to optimizing a profit function, which can balance any number of optimization efforts. Specifically, timing closure during the design process typically means chip functionality performance limits with all the other requirements, as set out above, being set and defined fixed values. This means optimizing for performance, if higher performance chips have a better profit margin. Making the profit a function of the clock cycle or the setup slack and changing the design to optimize profit implicitly results in tightening up the yield curve towards more high performance chips. By extending the notion of a profit function to multiple metrics, the optimization can be tailored to maximize profit for each application. For example, making voltage and temperature limits the optimization parameters (i.e., the metrics for which yield is calculated, as described above), allows designers to balance the cost of power supply and cooling improvements versus the profit of the chip build. Furthermore, combining these with a power consumption yield calculation optimizes the power consumption of the chip in addition to the performance and voltage supply. The profit function describes the balance between power and performance for this application. Of course, the power dissipation also interacts with temperature achievable with a given packaging and cooling solution. Additionally, by varying the manufacturing parameters, the parameter limits and target setting can be optimized to further improve the profit. For this the profit parameter sensitivity to process mean and limit adjustments is a helpful guidance to optimize the process for the given product. Chip reliability optimization can balance the performance degradation during the time of use with the value of the product, taking warranty time and chip application into account. The size of the chip and the number of the metal levels can be optimized to balance design efforts, with wire congestion and performance versus manufacturing and package cost. This impacts all other settings, which shows all of these settings are connected. Knowledge of the number of chips is required to justify many of the more complex optimization steps and the profit function will take this into account. Finally, the Shipped Product Quality Level (SPQL) requested by the customer together with the test requirements, which ensure the chip can be tested after manufacturing, set the limit requirements of the joint probability distribution function (JPDF) of the process parameters. Profit optimization allows balancing all these optimization efforts.

After a design is finalized, post design process steps can include, but are not limited to, the following. Other conventional release checks can be performed on the finalized design (120). Chips can be fabricated (i.e., manufactured) based on the design, as modified and finalized (122). Optionally, the results of the fabrication process (i.e., the manufactured chips) can be evaluated, for example, for changes in process sensitivities impacting any one or more of the metrics (i.e., the first metric, second metric and/or any additional metric) and the design can be remodified to account for such process sensitivities (126). If this occurs, processes 104-124, as described above, can be repeated as necessary in order to achieve the optimal design for yield and profit in light of the changed process sensitivities (127).

Figure 4:
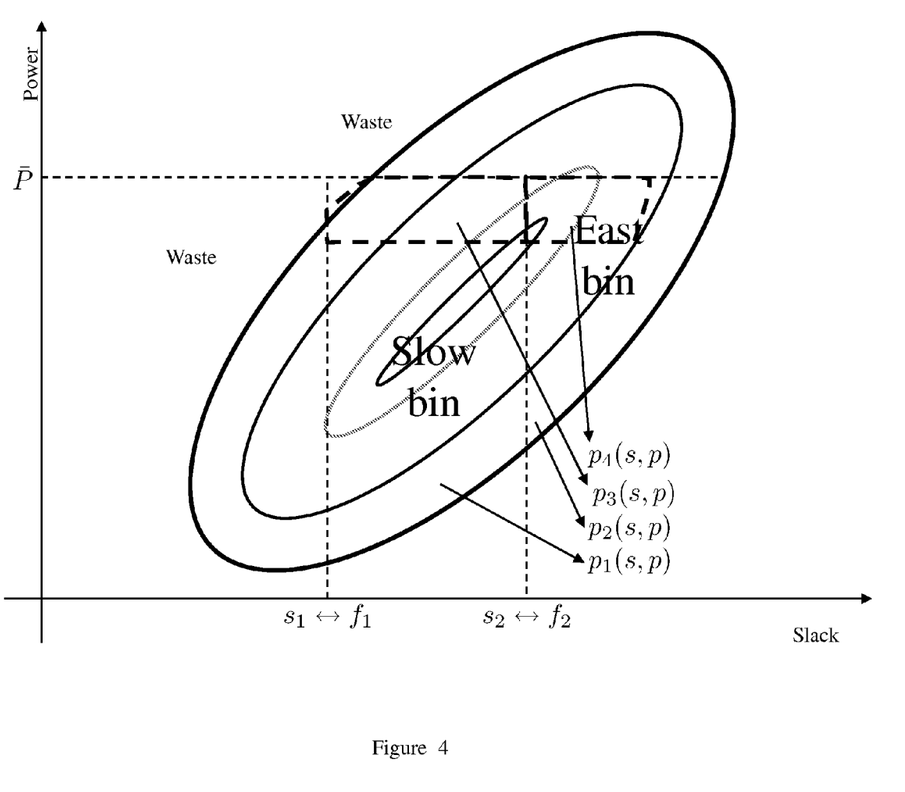
FIG. 4 is a graph illustrating an exemplary binning process that can be performed in conjunction with performance of the method embodiments of FIG. 1.

Finally, a binning process can be performed (128). Specifically, chips can be separated into bins such that that each bin represents a specific operating range for a specific metric of interest (i.e., a specified one of the first metric, the second metric or any additional metrics). Chips are distributed into multiple bins based upon the ranges defined. Some operating ranges are of more interest to customers and therefore prices are higher. As a result different combinations of profit levels and metric value levels for all metrics are used to maximum profit (for at least one metric, etc.) and the resultant binned chips represent the maximum profit as a function of customer constraints and business needs. More specifically, this binning enables the embodiments not only to optimize performance or power or any other metric to the parameter set itself, but also to use the range limit, $\vec{x}_{max}$, $\vec{x}_{min}$ as optimization values and to provide for profit optimized binning. That is, the embodiments divide the of range limits into multiple sets of range limits, called 'bins', each defines a subset of the chips build. The statistical analysis describes the yield for each set of limits, the number of chips per 'bin', a process called chip 'binning'. Each bin represents a different value of chips. Optimizing the number of chips per bin in the relation to the value of the bin optimizes the manufactured chip value. The results optimized the value of the chips build and gives feed back to manufacturing to further improve the profit the chips built can deliver. FIG. 4 shows a graph illustrating this binning process specifically based on power consumption and performance. For example, the slow bin is defined to be the slack range in between s1 and s2, where s1 and s2 refer to slack values. As for Power, the Waste region is when power is beyond $\overline{P}$. The ovals represent the joint probability distribution of power and slack, where p(s,p) represents the probability of slack, s and power, p.

On exemplary embodiment of the disclosed computer-implemented method relates specifically to designing a chip to optimize yielding parts in different bins as a function performance and power consumption, while simultaneously maximizing the profit potential of the resulting chip bins. Specifically, this embodiment separately calculates a first joint probability distribution as a function of performance and a second joint probability distribution as a function of power consumption. Again, referring to FIG. 1, the initial steps of the particular embodiment include accumulating design information (e.g., defining the specifications of the chip based on customer requirements (102), generating the front-end (FE) design for the chip (104), and creating a technology model based on the FE design (106)). The defined specifications can include, but are not limited to, the following customer requirements that will impact the value of the chip, the potential yield, and the potential profit:

(1) Process parameter targets and limits that describe the mean and distribution probability of the manufacturing process variation.

(2) Chip functionality limits (e.g., requiring a margin for same cycle hold tests).

(3) Chip performance limits (i.e., the clock cycle needed to support the customer application).

(4) Upper and lower voltage limits (i.e., the voltage limits that will be applied to the chip power supply).

(5) Upper and lower temperature limits (e.g., the cooling capability requirements).

(6) Chip power consumption limits.

(7) Chip reliability requirements (i.e., chip life expectancy limits, which define the power-on hours and the average voltage and temperature environments that the chip will experience).

(8) Chip die size.

(9) Number of metal levels.

(10) Test requirements to ensure the chip can be tested after manufacturing.

(11) Number of chips requested by the customer.

(12) Shipped Product Quality Level requested by the customer.

Then, this design information, including but not limited to, the above-listed specification, a design netlist, RC parasitic information, timing constraints, clock definitions, circuit delay models, etc., is loaded (107) and processed in the design process 210 in the design flow 200 of FIG. 2 (see detailed discussion of design flow 200 below), according to method steps 108-120.

Specifically, once the design information is loaded at process 107, this embodiment comprises calculating, by a computer and based on a design of a chip, a first joint probability distribution as a function of first values representing performance by generating a canonical timing model (108). It accomplishes this by performing a Statistical Static Timing Analysis (SSTA) that computes sensitivities to sources of variation and how these sensitivities impact timing (i.e., delays, transition times, slacks, etc.) and, based on the analysis, generating a canonical timing model (109).

More specifically, a block-based statistical timing analysis can be performed (e.g., using the block-based statistical timing engine within IBM's statistical timing tool EinsStat) to generate a canonical timing model (i.e., a canonical first order delay model). It should be understood that a canonical model implies a standard functional model parameterized by multiple different sources of variations. That is, such a canonical timing model accounts for delay variability as a function of manufacturing, environmental factors (e.g., Vdd, temperature, etc.) and device fatigue phenomena. As described in detail in "First-Order Incremental Block-Based Statistical Timing Analysis" of Visweswariah et al., DAC 2004, Jun. 7-12, 2004, San Diego, Calif.), incorporated herein by reference, such a canonical delay model can be expressed as follows:

$$a_0 + \sum_{i=1}^{n} a_i \Delta X_i + a_{n+1} \Delta R_a$$

where $a_0$ is the mean or nominal value, $\Delta X_i$, i=1, 2, ..., n represent the variation of n global sources of variations $X_i$, i=1, 2, ..., n from their nominal values, $a_i$, i=1, 2, ... n are the sensitivities to each of the global sources of variation, $\Delta R_a$ is the variation of independent random variable Ra from its man value and $a_n+1$ is the sensitivity of the timing quantity to $R_a$. With scaling of the sensitivity coefficients, $X_i$ and $R_a$ are assumed to be unit normal or Gaussian distributions N (0,1). A unique canonical delay model is calculated for every block within the design, using the same predefined variables. These canonical delay models can be easily added together to create an overall model representing total delay sensitivity to a given source of variation and to generate a curve representing the probability distribution for a range of delay values. Thus, they can be used to calculate yield as a function of performance.

This embodiment further comprises calculating, by a computer and based on the design of the chip, a second joint probability distribution as a function of second values representing power consumption. It accomplishes this by performing a power consumption analysis and, based on the analysis, generating a canonical power model.

More specifically, a first-order Taylor-series block-based power consumption analysis can be used to generate a canonical first order power model for a given circuit block within a design. Such a canonical power model similarly accounts for power consumption variability as a function of manufacturing, environmental factors and other phenomena (e.g., leakage, gate leakage, etc.). This first-order canonical power model can be expressed as follows, with a mean value, $a_0$, plus sensitivity, $a_i$, for each variable within the function.

$$f(x_1, x_2, \ldots x_n) = a_0 + \sum_{i=1}^{n} a_i \Delta X_i$$

where $a_0$ is the mean or nominal value, $\Delta X_i$, i=1, 2, ..., n represent the variation of n global sources of variations $X_i$, i=1, 2, ..., n from their nominal values, $a_i$, i=1, 2, ... n are the sensitivities to each of the global sources of variation for the function of variables $x_1, x_2, \ldots x_n$.

A unique canonical power model is calculated for every block within the design, using the same predefined variables. These canonical power models can be easily added together to create an overall model representing total power consumption sensitivity to a given source of variation and to generate a curve representing the probability distribution for a range of values. Thus, they can be used to calculate yield as a function of power consumption.

It should be noted that the canonical power model and the canonical timing model, described above, are dependent upon the same set of predetermined settings (e.g., customer requirements, such as minimum and maximum thresholds for voltage level, temperature, life expectancy, chip size, number of metal levels, quality level, etc.), but on different process sensitivities.

Next, a first yield curve is generated based on the first joint probability distribution and a second yield curve is generated based on the second joint probability distribution (110). Specifically, the first joint probability distribution is integrated over a minimum and maximum performance range to generate a yield-performance curve (111). Such a yield curve show the fraction or percentage of working chips that can be manufactured for a given clock definition and state of the netlist. This depends upon the manufacturing models. Similarly, a second joint probability distribution is integrated over a minimum and maximum power consumption range to generate a yield-power consumption curve (111).

Once the yield calculations are performed at process 110, profit function can be set up and applied to reduce the values of all of these metrics to a common profit denominator (112-114). For example, monetary values can be associated with the performance values and with the power consumption values. For example, mobile applications may be able to realize greater profits for relatively low power consumption values and relatively high performance values (e.g., increased clock frequencies, which may also be expressed in terms of decreased delay). Thus, in such applications relatively low power consumption values and relatively high performance values would be associated with relatively high monetary values. Additionally, the importance of the particular metric to the application can be weighted based on these monetary values. For example, in a particular mobile application, ultra low power consumption may be considered more important than performance. Thus, in such an application lower power consumption values could be associated with higher monetary values than higher performance values. This power function enables the yield calculations as a function of both performance and power consumption to be combined into a single timing-power-profit model (114). That is, the canonical timing and power models and, more particularly, the two yield curves generated at process 110 can be combined at process 114, using the monetary values, to form a single timing-power-profit model (i.e., a yield-weighted profit function).

Based on this single timing-power-profit model, the design of the chip can be modified in order to simultaneously optimize yield as a function of both the first values and the second values (i.e., the performance and power consumption values) and maximize profit potential by considering the monetary values for the performance and power consumption values (116-118). That is, this timing-power-profit model allows a designer to consider the impact on profit of any proposed design changes (i.e., parameter changes), when performing a balancing process (i.e., a trade-off process between proposed design changes) in order to optimize yield as a function of both performance and power consumption in order to determine the best design for both yield and profit. Specifically, the model can be translated into a set of metrics which allow for design changes (e.g., design changes which would impact power consumption and timing.) to directly vary the profit potential of the chip. After the design modifications are selected, the processes 104-116, as described above, can be repeated as necessary in order to achieve the optimal design for yield and profit (119). Thus, the design process 210 of FIG. 2 now extends from closing timing to optimizing this profit function.

In this particular embodiment, as with the previously described embodiment, after a design is finalized, post design process steps can include, but are not limited to, the following. Other conventional release checks can be performed on the finalized design (120). Chips can be fabricated (i.e., manufactured) based on the design, as modified and finalized (122). Optionally, the results of the fabrication process (i.e., the manufactured chips) can be evaluated, for example, for changes in process sensitivities impacting performance and/or power consumption and the design can be remodified to account for such process sensitivities (126). If this occurs, processes 104-124, as described above, can be repeated as necessary in order to achieve the optimal design for yield and profit in light of the changed process sensitivities (127).

Finally, a binning process can be performed (128). Specifically, chips can be separated into bins such that each bin represents a specific operating range for a specific metric of interest (in this case, either performance or power consumption). Chips are distributed into multiple bins based upon the ranges defined. Some operating ranges are of more interest to customers and therefore prices are higher. As a result different combinations of profit levels and metric value levels for all metrics are used to maximum profit (for at least one metric, etc.) and the resultant binned chips represent the maximum profit as a function of customer constraints and business needs. More specifically, this binning enables the embodiment not only to optimize performance and power to the parameter set itself, but also to use the range limit, $\vec{x}_{max}$, $\vec{x}_{min}$ as optimization values and to provide for profit optimized binning. That is, the embodiments divide the of range limits into multiple sets of range limits, called 'bins', each defines a subset of the chips build. The statistical analysis describes the yield for each set of limits, the number of chips per 'bin', a process called chip 'binning'. Each bin represents a different value of chips. Optimizing the number of chips per bin in the relation to the value of the bin optimizes the manufactured chip value. The results optimized the value of the chips build and gives feed back to manufacturing to further improve the profit the chips built can deliver. See discussion of FIG. 4 above.

Referring now to FIG. 2 in combination with FIG. 1, the method steps 108-120 described above can be performed in conjunction with the design flow 200 of FIG. 2. Design flow 200 includes processes, machines and/or mechanisms for processing design structures or devices to generate logically or otherwise functionally equivalent representations of the chip design. The design structures processed and/or generated by design flow 200 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 200 may vary depending on the type of representation being designed. For example, a design flow 200 for building an application specific IC (ASIC) may differ from a design flow 200 for designing a standard component or from a design flow 200 for instantiating the design into a programmable array, for example a programmable gate array (PGA) or a field programmable gate array (FPGA) offered by Altera® Inc. or Xilinx® Inc.

FIG. 2 illustrates multiple such design structures including an input design structure 220 that is preferably processed by a design process 210. Design structure 220 may be a logical simulation design structure generated and processed by design process 210 to produce a logically equivalent functional representation of a hardware device. Design structure 220 may also or alternatively comprise data and/or program instructions that when processed by design process 210, generate a functional representation of the physical structure of a hardware device. Whether representing functional and/or structural design features, design structure 220 may be generated using electronic computer-aided design (ECAD) such as implemented by a core developer/designer. When encoded on a machine-readable data transmission, gate array, or storage medium, design structure 220 may be accessed and processed by one or more hardware and/or software modules within design process 210 to simulate or otherwise functionally represent a given integrated circuit chip design. As such, design structure 220 may comprise files or other data structures including human and/or machine-readable source code, compiled structures, and computer-executable code structures that, when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 210 preferably employs and incorporates hardware and/or software modules for synthesizing, translating, or otherwise processing a design/simulation functional equivalent of given integrated circuit chip design to generate a netlist 280 which may contain design structures such as design structure 220. Netlist 280 may comprise, for example, compiled or otherwise processed data structures representing a list of wires, discrete components, logic gates, control circuits, I/O devices, models, etc. that describes the connections to other elements and circuits in an integrated circuit design. Netlist 280 may be synthesized using an iterative process in which netlist 280 is resynthesized one or more times depending on design specifications and parameters for the device. As with other design structure types described herein, netlist 280 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 210 may include hardware and/or software modules for processing a variety of input data structure types including netlist 280. Such data structure types may reside, for example, within library elements 230 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 240, characterization data 250, verification data 260, design rules 270, and test data files 285 which may include input test patterns, output test results, and other testing information. Design process 210 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 210 without deviating from the scope and spirit of the invention.

Design process 210 may also include hardware and/or software modules other for performing standard circuit design processes such as timing analysis, verification, design rule checking, place and route operations, or any other analysis tool required to perform the above-described yield calculations at process 110 of FIG. 1. Design process 210 may further include hardware and/or software modules for setting and applying the above-described profit function at processes 112-114 of FIG. 1.

Design process 210 employs and incorporates logic and physical design tools such as HDL compilers and simulation model build tools to process and modify (e.g., at process 118 of FIG. 1) design structure 220 together with some or all of the depicted supporting data structures along with any additional mechanical design or data (if applicable), to generate a final design structure 290. Final design structure 290 resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Final design structure 290 preferably comprises one or more files, data structures, or other computer-encoded data or instructions that reside on transmission or data storage media and that when processed by an ECAD system generate a logically or otherwise functionally equivalent embodiment of the given integrated circuit chip design, as modified according to the method embodiments of FIG. 1. In one embodiment, final design structure 290 may comprise a compiled, executable HDL simulation model that functionally simulates the devices contained in the modified integrated circuit chip design.

Design structure 290 may also employ a data format used for the exchange of layout data of integrated circuits and/or symbolic data format (e.g. information stored in a GDSII (GDS2), GL1, OASIS, map files, or any other suitable format for storing such design data structures). Design structure 290 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce the designed integrated circuit chip, as modified. Design structure 290 may then proceed to a stage 295 where, for example, design structure 290: proceeds to tape-out, is released to manufacturing, is released to a mask house, is sent to another design house, is sent back to the customer, etc.

Also disclosed herein are embodiments of a computer program product comprising a computer usable medium having computer useable program code embodied therewith. In these embodiments the computer usable program code is configured to perform the above-described chip design method embodiments, as illustrated in FIG. 1 and implemented using the design process of FIG. 2. That is, the embodiments of the invention can take the form of an entirely hardware embodiment, an entirely software embodiment or an embodiment including both hardware and software elements. In one embodiment, the invention is implemented in software, which includes but is not limited to firmware, resident software, microcode, etc. Furthermore, the embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

As mentioned above, FIG. 3 shows a representative hardware environment for practicing the above-described embodiments of the invention. This schematic drawing illustrates a hardware configuration of an information handling/computer system in accordance with the embodiments of the invention. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the corresponding structures, materials, acts, and equivalents of all means or step plus function elements in the claims below are intended to include any structure, material, or act for performing the function in combination with other claimed elements as specifically claimed. Additionally, it should be understood that the above-description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated. Well-known components and processing techniques are omitted in the above-description so as to not unnecessarily obscure the embodiments of the invention.

It should further be understood that the terminology used in the above-description is for the purpose of describing particular embodiments only and is not intended to be limiting of the invention. For example, as used herein, the singular forms "a", "an" and "the" are intended to include the plural forms as well, unless the context clearly indicates otherwise. Furthermore, as used herein, the terms "comprises", "comprising," and/or "incorporating" when used in this specification, specify the presence of stated features, integers, steps, operations, elements, and/or components, but do not preclude the presence or addition of one or more other features, integers, steps, operations, elements, components, and/or groups thereof.

Therefore, disclosed above are embodiments of a computer-implemented method of designing a chip to optimize yielding parts in different bins as a function of multiple diverse metrics and further to maximize the profit potential of the resulting chip bins. Specifically, the embodiments separately calculate joint probability distributions, each joint probability distribution being a function of a different metric (e.g., performance, power consumption, etc.). Discrete yield curves are then generated based on each of the joint probability distribution functions. A profit function then reduces the values of all of the metrics (e.g., performance values, power consumption values, etc.) to a common profit denominator (e.g., to monetary values indicating profit that may be associated with a given metric value). The profit function and, more particularly, the monetary values can be used to combine the various yield curves into a combined profit-based yield curve from which a profit model can be generated. Based on this profit model, changes to the chip design can be made in order to optimize yield as a function of all of the diverse metrics (e.g., performance, power consumption, etc.) and further to maximize the profit potential of the resulting chips. That is, this profit model allows a designer to balance, based on potential profit changes, the impact that design changes (i.e., parameter changes) would have on yield as a function of different metrics and, thereby to determine the best design for both yield and profit.

Therefore, there are a number of different advantages to using the above-described chip design and fabrication method embodiments. For example, one advantage of the above-described embodiments is the ability to create a variable setting weighted by the profit function instead of fixed thresholds. In other words, profit as a function of power or cycle time can take any shape depending on the application (stepwise, linear, all-or-nothing, etc.). A second advantage is that relative weight of different settings is set by the profit function. This allows optimizing one setting, like performance, while at the same time including (or constraining) all other settings like power and voltage. It also allows optimizing many settings at the same time as they are all combined to allow profit optimization. All these settings depend on the customer application of the chip and are combined to a profit value. A third advantage is that existing optimization techniques can be applied with profit as the objective function, thereby enabling powerful new techniques without retooling. A fourth advantage is that improvements to the design can be quickly evaluated to determine if the profit function improved or worsened. Finally, a fifth advantage is that gradients of the profit function can be used to guide the optimization procedure.

What is claimed is:
1. A chip design and fabrication method comprising:
calculating, by a computer and based on a design of a chip, a first joint probability distribution as a function of first values for a first metric and, based on said first joint probability distribution, generating a first yield curve;
calculating, by said computer and based on said design of said chip, a second joint probability distribution as a function of second values for a second metric that is different from said first metric and, based on said second joint probability distribution, generating a second yield curve;

associating monetary values with said first values and with said second values, said monetary values indicating profits associated with said first values and said second values;

using said monetary values to combine said first yield curve and said second yield curve into a combined yield curve; and modifying said design, based on said combined yield curve, in order to simultaneously optimize yield as a function of both said first values and said second values and maximize profit potential by considering said monetary values for said first values and said second value.

2. The chip design and fabrication method of claim 1, said first metric comprising performance.

3. The chip design and fabrication method of claim 2, said first joint probability distribution being calculated by performing a Statistical Static Timing Analysis.

4. The chip design and fabrication method of claim 1, said second metric comprising any of power consumption, voltage level, temperature, life expectancy, chip size, number of metal levels, and quality level.

5. The chip design and fabrication method of claim 1, further comprising fabricating chips based on said design, as modified.

6. The chip design and fabrication method of claim 5, further comprising evaluating results of said fabricating and remodifying said design to account for process sensitivities impacting at least one of said first metric and said second metric.

7. The chip design and fabrication method of claim 5, further comprising separating said chips into bins such that each bin represents a specific operating range for a specific one of said first metric and said second metric.

8. A chip design and fabrication method comprising:
calculating, by a computer and based on a design of a chip, a first joint probability distribution as a function of first values for a first metric and, based on said first joint probability distribution, generating a first yield curve;

calculating, by said computer and based on said design of said chip, a second joint probability distribution as a function of second values for a second metric that is different from said first metric and, based on said second joint probability distribution, generating a second yield curve;

calculating, by said computer and based on said design of said chip, at least one additional joint probability distribution as a function of additional values for at least one additional metric and, based on said at least one additional joint probability distribution, generating at least one additional yield curve;

associating monetary values with said first values, with said second values, and with said additional values, said monetary values indicating profits associated with said first values, said second values and said additional values; and using said monetary values to combine said first yield curve, said second yield curve and said at least one additional yield curve into a combined yield curve;

modifying said design, based on said combined yield curve, in order to simultaneously optimize yield as a function of said first values, said second values, and said additional values and maximize profit potential by considering said monetary values for said first values, said second values, and said additional values.

9. The chip design and fabrication method of claim 8, said first metric comprising performance.

10. The chip design and fabrication method of claim 8, said first joint probability distribution being calculated by performing a Statistical Static Timing Analysis.

11. The chip design and fabrication method of claim 8, said second metric and said at least one additional metric comprising any of power consumption, voltage level, temperature, life expectancy, chip size, number of metal levels, and quality level.

12. The chip design and fabrication method of claim 8, further comprising fabricating chips based on said design, as modified.

13. The chip design and fabrication method of claim 12, further comprising evaluating results of said fabricating and remodifying said design to account for process sensitivities impacting at least one of said first metric, said second metric, and said at least one additional metric.

14. The chip design and fabrication method of claim 12, further comprising separating said chips into bins such that each bin represents a specific operating range for a specific one of said first metric and said second metric.

15. A chip design and fabrication method comprising:
calculating, by a computer and based on a design of a chip, a first joint probability distribution as a function of first values for a first metric and, based on said first joint probability distribution, generating a first yield curve;

calculating, by a computer and based on said design of said chip, a second joint probability distribution as a function of second values for a second metric that is different from said first metric and, based on said second joint probability distribution, generating a second yield curve, said calculating of said first joint probability distribution and said calculating of said second joint probability distribution being dependent upon a same set of predetermined settings and on different process sensitivities of said first metric and said second metric;

associating monetary values with said first values and with said second values, said monetary values indicating profits associated with said first values and said second values; and using said monetary values to combine said first yield curve and said second yield curve into a combined yield curve; and modifying said design, based on said combined yield curve, in order to simultaneously optimize yield as a function of both said first values and said second values and maximize profit potential by considering said monetary values for said first values and said second value.

16. The chip design and fabrication method of claim 15, said first metric comprising performance.

17. The chip design and fabrication method of claim 15, said first joint probability distribution function being calculated by performing a Statistical Static Timing Analysis.

18. The chip design and fabrication method of claim 15, said second metric comprising any of power consumption, voltage level, temperature, life expectancy, chip size, number of metal levels, and quality level.

19. The chip design and fabrication method of claim 15, further comprising fabricating chips based on said design, as modified.

20. The chip design and fabrication method of claim 19, further comprising evaluating results of said fabricating and remodifying said design to account for process sensitivities impacting at least one of said first metric and said second metric.

21. The chip design and fabrication method of claim 19, further comprising separating said chips into bins such that each bin represents a specific operating range for a specific one of said first metric and said second metric.

22. A chip design and fabrication method comprising:
calculating, by a computer and based on a design of a chip, a first joint probability distribution as a function of first values representing performance by generating a canonical timing model and, based on said first joint probability distribution, generating a first yield curve;
calculating, by a computer and based on said design of said chip, a second joint probability distribution as a function of second values representing power consumption by generating a canonical power model, said canonical power model and said canonical timing model being dependent upon a same set of predetermined settings, but different process sensitivities and, based on said second joint probability distribution, further calculating a second yield curve;
associating monetary values with said first values and with said second values, said monetary values indicating profits associated with said first values and said second values;
using said monetary values to combine said first yield curve and said second yield curve into a combined yield curve and, based on said combined yield curve, generating a timing-power-profit model; and
modifying said design, based on said timing-power-profit model, in order to simultaneously optimize yield as a function of both said first values and said second values and maximize profit potential by considering said monetary values for said first values and said second value.

23. The chip design and fabrication method of claim 22, said first probability distribution being calculated based on results of a Statistical Static Timing Analysis.

24. The chip design and fabrication method of claim 22, said predetermined settings comprising minimum and maximum thresholds for any of voltage level, temperature, life expectancy, chip size, number of metal levels, and quality level.

25. A computer program product comprising a non-transitory computer usable medium having computer useable program code stored thereon, said computer usable program code being configured to perform a chip design method, said method comprising:
calculating, based on a design of a chip, a first joint probability distribution as a function of first values for a first metric and, based on said first joint probability distribution, generating a first yield curve;
calculating, based on said design of said chip, a second joint probability distribution as a function of second values for a second metric and based on said second joint probability distribution, generating a second yield curve;
associating monetary values with said first values and with said second values, said monetary values indicating profits associated with said first values and said second values;
using said monetary values to combine said first yield curve and said second yield curve into a combined yield curve; and
modifying said design, based on said combined yield curve, in order to simultaneously optimize yield as a function of both said first values and said second values and maximize profit potential by considering said monetary values for said first values and said second value.

* * * * *